United States Patent
Schafer

(10) Patent No.: US 6,404,755 B1
(45) Date of Patent: Jun. 11, 2002

(54) MULTI-LEVEL INFORMATION MAPPING SYSTEM AND METHOD

(75) Inventor: David C. Schafer, South Bend, IN (US)

(73) Assignee: Harris Broadband Wireless Access, Inc., Bellevue, WA (US)

( * ) Notice: Subject to any disclaimer, the term of this patent is extended or adjusted under 35 U.S.C. 154(b) by 0 days.

(21) Appl. No.: 09/327,787

(22) Filed: Jun. 7, 1999

Related U.S. Application Data

(63) Continuation-in-part of application No. 08/740,332, filed on Nov. 7, 1996, now Pat. No. 6,016,313.

(51) Int. Cl.[7] ........................ H04B 7/216; H04B 7/212; H04J 3/16; H04L 5/12; H04L 23/02
(52) U.S. Cl. ........................ 370/338; 370/342; 370/347; 370/442; 370/465; 375/224; 375/227; 375/261
(58) Field of Search ................................ 370/338, 442, 370/465, 342, 347, 395, 538, 206, 207, 490, 491; 375/224, 227, 261, 221, 225, 257, 262

(56) References Cited

U.S. PATENT DOCUMENTS

| | | | |
|---|---|---|---|
| 4,633,463 A | 12/1986 | Mack | 370/95 |
| 4,697,281 A | 9/1987 | O'Sullivan | 379/59 |
| 4,747,160 A | 5/1988 | Bossard | 455/33 |
| 5,095,535 A | 3/1992 | Freeburg | 455/278 |

(List continued on next page.)

FOREIGN PATENT DOCUMENTS

| | | | | |
|---|---|---|---|---|
| EP | 0332825 | 1/1989 | ............ | H04Q/7/04 |
| EP | 0458158 | 5/1991 | ............ | H04Q/7/04 |
| EP | 0720405 | 12/1995 | ............ | H04Q/7/36 |
| EP | 0731620 | 1/1996 | ............ | H04Q/7/24 |
| EP | 0845916 | 6/1998 | ............ | H04Q/7/36 |
| WO | 9213398 | 8/1992 | ............ | H04B/7/00 |
| WO | WO 94/11955 | 5/1994 | ............ | H04B/1/38 |
| WO | 9517724 | 6/1995 | ............ | G06F/13/00 |
| WO | WO 97/13388 | 4/1997 | ............ | H04Q/7/38 |
| WO | WO 98/20633 | 5/1998 | ............ | H04B/7/24 |
| WO | WO 99/12302 | 3/1999 | ............ | H04L/1/12 |
| WO | WO 99/14973 | 3/1999 | ............ | H04Q/7/38 |

OTHER PUBLICATIONS

PCT International Search Report dated Sep. 15, 2000.
"Implementation and Performance of QAM–Level–Controlled Adaptive Modulation for Land Mobile Communications", Hamaguchi K. et al., Electronic Letters, IEE Stevenage, vol. 33, No. 18, pp. 1529–1531; XP–000739566; dated Aug. 28, 1997.
PCT/US97/16710 International Search Report.
"DMS Series (Digital Multipoint System) Next Generation Broadband Flexible Radio Access Network," Bosch Telecom Microwave Systems Product Group, Backnang, Germany.
"DMS Series Broadband Access Radio System."
"Antenna Solutions for Point–to–Multipoint Radio Systems;" H. Ansorge, M. Guttenberger, K.H. Mierzwiak, U. Oehler, H. Tell; Bosch Telecom GmbH, D–71522 Backnang.

(List continued on next page.)

Primary Examiner—Wellington Chin
Assistant Examiner—M. Phan
(74) Attorney, Agent, or Firm—Duane Morris LLP

(57) ABSTRACT

A system and method for providing adjustable levels of information density in a communicated data stream in response to monitored communication link conditions is disclosed. In a preferred embodiment the data stream is a time division multiple access data stream providing data communication to a plurality of geographically separated systems. The information density of time bursts associated with each such system may be independently adjusted according to the disclosed invention based upon each such system's link conditions. A preferred embodiment of the invention utilizes a mapping technique in order to utilize a modulator adjusted for a high level information density to emulate lower level information density transmission.

53 Claims, 4 Drawing Sheets

U.S. PATENT DOCUMENTS

| | | | |
|---|---|---|---|
| 5,195,091 A | | 3/1993 | Farwell et al. .............. 370/94.1 |
| 5,233,629 A | * | 8/1993 | Paik et al. ................... 375/262 |
| 5,245,610 A | | 9/1993 | Lindell ...................... 370/95.1 |
| 5,295,178 A | | 3/1994 | Nickel et al. ................. 379/58 |
| 5,323,421 A | * | 6/1994 | LaRosa et al. ............... 375/224 |
| 5,355,520 A | | 10/1994 | Freeburg et al. ........... 455/53.1 |
| 5,363,408 A | * | 11/1994 | Paik et al. ................... 375/261 |
| 5,437,057 A | | 7/1995 | Richley et al. ............... 455/41 |
| 5,488,737 A | | 1/1996 | Harbin et al. .............. 455/33.1 |
| 5,509,028 A | | 4/1996 | Marque-Pucheu .......... 375/211 |
| 5,533,004 A | * | 7/1996 | Jasper et al. ................ 370/204 |
| 5,548,814 A | | 8/1996 | Lorang et al. ............. 455/38.1 |
| 5,557,656 A | | 9/1996 | Ray et al. ..................... 379/59 |
| 5,561,850 A | | 10/1996 | Mäkitalo et al. ........... 455/52.3 |
| 5,564,121 A | | 10/1996 | Chow et al. ................ 455/53.1 |
| 5,677,928 A | | 10/1997 | Rizzo et al. ................ 375/202 |
| 5,729,526 A | * | 3/1998 | Yoshida ...................... 370/206 |
| 5,751,767 A | * | 5/1998 | Tatsumi ...................... 375/224 |
| 5,828,695 A | | 10/1998 | Webb ......................... 375/219 |
| 6,005,890 A | * | 12/1999 | Clow et al. .................. 375/221 |
| 6,181,714 B1 | * | 1/2001 | Isaksson et al. ............ 370/491 |
| 6,195,396 B1 | * | 2/2001 | Fang et al. .................. 375/261 |

OTHER PUBLICATIONS

"Dynamic Bandwidth Allocation for FDMA Systems;" Dr. Erich Auer; Bosch Telecom D–71522 Backnang, Germany.

"Link Capacity and Cellular Planning Aspects for a Point to Multipoint Fixed Radio Access System;" A. Bollmann, D. Cichon, M. Glauner; Bosch Telecom GmbH, D–71522 Backnang, Germany; IHE, Universität Karlsruhe (TH), D–76128 Karlsruhe, Germany.

"DMS Series Digital Multipoint System Fixed Radio Access Systems Description;" Issue 3, Nov. 1995; Dr. Hans–Peter Perry; Bosch Telecom Microwave Systems Division Backnang, Germany.

* cited by examiner

MULTI-LEVEL INFORMATION MAPPING SYSTEM AND METHOD

The present application is a continuation-in-part of and commonly assigned United States patent application serial number 08/740,332 filed Nov. 7, 1996, entitled "SYSTEM AND METHOD FOR BROADBAND MILLIMETER WAVE DATA COMMUNICATION", issued as U.S. Pat. No. 6,016,313 and currently undergoing re-examination as Merged Re-examination Proceedings as application serial number 90/005,726 dated May 15, 2000 and application serial number 90/005,974 dated Apr. 5, 2001, the disclosure of which is incorporated herein by reference.

TECHNICAL FIELD OF THE INVENTION

The invention relates to radio frequency communication systems and methods and more particularly to a system and method which provides for the dynamic adjustment of information density communicated.

BACKGROUND OF THE INVENTION

Information communication between systems separated by significant physical distances has been an obstacle to integration of such systems. The choices available to bridge the physical gap between such systems have not only been limited, but have required undesirable tradeoffs in cost, performance, and reliability.

For example microwave radio links may be deployed to bridge such gaps. However, microwave, as well as other wireless, communications experience signal degradation due to link characteristics which may include both constant and time varying factors. For example, link signals experience attenuation as a function of the link distance which is a constant. Additionally, signal attenuation may be time variant as a function of atmospheric conditions, such as the presence of precipitation, i.e., rain, within the link. Moreover, these atmospheric conditions may not be constant throughout the link and, therefore, may affect the link signal differently at different portions of the link.

Presently, microwave radio links are generally designed or engineered with, often substantial, fade margins to guarantee high signal availability even in the presence of time varying fades, such as may be caused by rainfall. For example, it is often desired that a link have an availability of 99.995%, even in the presence of deep fades associated with the above described rainfall. Accordingly, link communications parameters may be adjusted at deployment to provide this level of availability.

The data rate at which a link may operate is generally a function of the minimum signal to noise ratio present during the worst case fade, i.e., in the above mentioned case the 99.995% point. Accordingly, the link parameters which are adjusted to provide the desired link availability may include the link transmit power level and/or link information density, i.e., increasing the transmit power level to a magnitude sufficient for the deepest expected fade and/or reducing the information density to a point where the maximum fade may be tolerated without an unacceptable error rate.

However, the worst case conditions may only manifest occasionally. Accordingly, the bulk of the time the link may operate at a much higher signal to noise ratio than is necessary to provide the desired communications. Accordingly, a need exists in the art for a system and method for dynamically adjusting link information density to exploit the capability of the link supporting a much higher data rate during times of less than maximum expected attenuation experienced in the link.

A further need exists in the art for the system and method for adjusting link information density to operate at an optimum data rate which does not sacrifice a desired level of link availability.

A still further need exists in the art for the adjusting of link information density to be independent with respect to any system communicating via a common link in order to allow for independent optimization of the information density for each such system.

SUMMARY OF THE INVENTION

These and other objects, features and technical advantages are achieved by a system and method which monitors link conditions and dynamically selects a particular modulation level from a multi-level modulation format, such as qadrature amplitude modulation (QAM), phase shift keying (PSK), frequency shift keying (FSK), amplitude shift keying (ASK), carrier less amplitude phase (CAP), or the like, determined to be optimum for the presently experienced link conditions. Preferably, the link conditions are monitored in both the uplink and downlink in order to achieve the desired level of availability in both the forward and reverse channels of a link. Moreover, uplink and downlink monitoring of parameters allows the present invention to provide link optimization independently in both the forward and reverse channels.

According to a preferred embodiment of the present invention, a constant baud rate but variable index (level) modulation format, such as QAM, is utilized in a radio link having a payload field and control field. Link parameters, such as a received signal strength indicator (RSSI) and/or a signal to noise ratio (SNR or signal to noise ratio estimate (SNRE), are continuously monitored at a receiver. The modulation index used is a function of the RSSI and/or SNRE and is dynamically changed by way of signaling over the aforementioned control field.

Accordingly, during periods of low RSSI and/or SNRE, such as those typically present during the deepest rain fades, the link will operate at a minimum modulation index, such as 4-QAM. As the RSSI and/or SNRE increase, i.e., the rain subsides, the modulation indexes, and thus the data rate, of the link is increased. For example, the link could be engineered for 99.995% availability while delivering a data rate X in 4-QAM mode. However, during periods of high signal to noise the link would operate at a higher modulation index, such as 256-QAM delivering data at a rate of 4X. Intermediate modulation indexes, such as 16-QAM, having a data rate of 2X, and 64-QAM, having a data rate of 3X, may also be utilized based on monitored link parameters.

A preferred embodiment of the present invention utilizes time division multiple access (TDMA) bursts and frames in order to provide seemingly simultaneous communications associated with a plurality of systems. Each of these systems may be disposed in a somewhat different location in the link. Accordingly, ones of these systems may have a different link distance, having associated therewith a constant link signal attenuation, and therefore may have a different minimum and/or maximum modulation index corresponding to the link distance.

Time varying link conditions may not be consistent throughout the link. Moreover, such conditions may be cumulative such that the longer the link the greater the affect associated with the condition. For example, a system located such that a relatively short air gap is used will experience less link signal attenuation due to rain than a system located such that a relatively long air gap is used, even when the rain density is consistent throughout the area of the link.

Accordingly, a preferred embodiment of the present invention provides for the adjustment of information density independently for frames and/or bursts associated with ones of the communication systems. For example, a first burst associated with a system utilizing the aforementioned relatively long link may include payload modulated in 4-QAM mode during a rain event while a second burst associated with a system utilizing the aforementioned relatively short link may include payload modulated in 64-QAM mode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

The present invention is adapted to dynamically adjust communication parameters associated with an information communication link in order to optimize information communication between systems in communication via the link by providing increased information density when supportable by the established link. According to a preferred embodiment of the present invention, a particular modulation level of a multi-level modulation format is selected for use based on link conditions. For example, a constant baud rate but variable index (level) modulation format, such as QAM, may utilized in a radio link and the M-ary QAM signaling level, hereinafter referred to as the QAM rate, adjusted according to the present invention, i.e., the number of bits per symbol at which information is transmitted is dynamically adjusted.

It shall be appreciated that, although a preferred embodiment of the present invention is described herein with reference to the QAM modulation technique, there is no such limitation of the present invention. One of ordinary skill in the art will readily appreciate that the invention as disclosed herein may be utilized with any of a number of multi-level modulation formats or other variable density information communication techniques, both now existing and later to be developed.

In order to better understand the concepts and features of the present invention, reference is made herein to a preferred communication system utilizing a centralized hub providing point to multi-point information communication to a plurality of communication nodes as more fully described in the above referenced patent application entitled "SYSTEM AND METHOD FOR BROADBAND MILLIMETER WAVE DATA COMMUNICATION." However, it shall be appreciated that the concepts and features of the present invention are useful with other communication systems, such as point to point systems, and, moreover, is not limited to use in wireless links. For example, where a wired network experiences temporary link degradation, such as might be caused equipment malfunction, the adjusting of communicated information density according to the present invention may be utilized to provide a desired minimum level of link availability.

Figure 1:
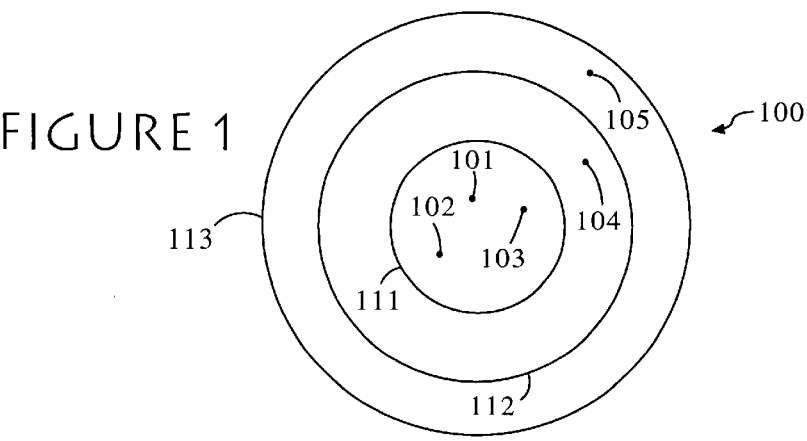
FIG. 1 shows a communication system, including a centralized hub and nodes disposed varying distances from the hub, suitable for use according to the present invention.

Directing attention to FIG. 1 communication system 100, including centralized hub 101 in communication with nodes 102–105 through radio frequency information communication links, is shown. It shall be appreciated that nodes 102–105 are disposed differing distances from hub 101. Specifically, nodes 102 and 103 are disposed within zone 111 relatively near hub 101, while node 104 is disposed in zone 112 somewhat more distant from hub 101. Finally, node 105 is disposed within zone 113 which is the farthest distance from hub 101.

Preferably, the antenna elements comprising hub 101 provide directional reception of extremely high frequency (EHF), such as that of 38 GHz providing millimeter wave (mmWave) communication in the Q-band. Such frequencies are advantageous as they have small wave lengths which are desirable for communication by highly directional antennas. Moreover, antennas utilized for communication of such frequencies may be physically small while providing large signal gain. The combination of such highly directional antennas with high gain provides for improved frequency reuse and reduces the likelihood of multi-path interference. Additionally, the large gain realized by such antennas is necessary to allow for communication over a reasonable distance from the antenna, such as, for example, three (3) miles from point to point while using reasonable power levels.

However, mmWave communications are susceptible to attenuation associated with atmospheric conditions such as rain. Accordingly, zones 111–113 are defined by aspects which affect the link between the nodes and the hub in which they are in communication with, such as distance and rain zone. Therefore, a particular information density may be associated with each zone in order to provide a desired level of link availability as between a node located within the zone and the hub. For example, zone 111 may be associated with 64-QAM, zone 112 may be associated with 16-QAM, and zone 113 may be associated with 4-QAM, where each QAM rate is selected to provide a desired link availability, such as 99.995%.

An increased density of data may be communicated to a node, geographically positioned near a hub, by the use of 256-QAM using the same occupied RF bandwidth and substantially the same transmitter power as the transmission of a signal containing a decreased density of data to a node, geographically positioned on the fringe of the hub's radiation pattern, by the use of 4-QAM. The transmission of increased data density to the near node without the need for significantly increased power is achievable in part because of lessened effects of signal attenuation, and thus a higher signal to noise ratio associated with a given power level, for the near node as compared to the far node. The higher signal to noise ratio experienced at the near node can typically sustain increased information density.

The initial QAM rate, or minimum QAM rate, determination may be made based on a particular signal strength providing a suitable carrier to noise (C/N) ratio for a particular QAM rate. For example, a C/N ratio (BER=$10^{-6}$) of 11 dB has been found to be sufficient to sustain a modulation of 4 QAM. Similarly, a C/N ratio (BER=10-6) of 21.5 dB has been found to be sufficient to sustain a modulation of 64 QAM.

However, it should be appreciated that a link adjusted to provide a particular level of availability, such as the above mentioned 99.995%, must necessarily be adjusted for the expected worst case time variant condition, such as the deepest expected signal fade due to rain. Accordingly, when such worst case conditions do not exist, there is available link capability for supporting a much higher data rate, i.e., the signal to noise ratio is sufficiently high to support a greater information density. For example, although node 105 is disposed in zone 113 associated with 4-QAM communication, in order to provide link availability of 99.995% in light of the link distance and rain zone, node 105 may be capable of communication of information densities of 16-QAM or even 64-QAM when link conditions are optimal.

Therefore, a preferred embodiment of the present invention monitors link conditions in order to provide adjustment of the communicated information density, i.e., adjustment of the QAM rate. Accordingly, link parameters, such as an RSSI and/or a SNRE, are monitored continuously or periodically. It shall be appreciated that if SNRE is used to determine link conditions, the present invention is useful in systems where the signal to interference ratio varies as a function of system loading, such as in code division multiple access (CDMA) systems.

When link conditions are determined to be suitable for a particular increased information density, a different QAM rate is selected for use by the link. Preferably, adjustment of the information density is communicated between the systems of the link, such as via a control field or channel in the link, in order the both transmitting and receiving equipment of the link may make appropriate adjustments. For example, link management information, such as control signals adjusting the aforementioned information density, and/or error correction information may be multiplexed as control information into the data stream communicated by a modem. Of course, any number of methods of providing link management and error detection/correction may be provided through the use of information multiplexed through a data stream communicated by a modem of the present invention.

Alternatively, the adjustment of the information density may be communicated by a path outside the link, such as through a separate control system link, if desired. Moreover, rather than communicating the adjustment by way of control information, adjustment of the information density may be detected or correspondingly adjusted independently at one end of the link, such as through analysis of the payload received or through independent analysis of the link conditions to arrive at a same optimum information density determination as the other end of the link.

Preferably, the link conditions are monitored in both the uplink and downlink in order to achieve the desired level of availability in both the forward and reverse channels of a link. For example, although receiving information with respect to adjustment of transmitted information density from the hub transmitter in order to adjust a node receiver and thus adjust the downlink for an optimum information density, the node may independently determine the propriety of adjusting the information density of the node transmitter, communicating this determination to the hub for corresponding adjustment of a hub receiver. Accordingly, a preferred embodiment of the present invention monitors both the uplink and downlink conditions for adjustment of the information density utilized in either portion of the link.

However, in an alternative embodiment of the present invention symmetry in the uplink and downlink portions of the link is relied upon to determine an information density for both portions of the link. It should be appreciated, however, that relying on such symmetry may not be desired even where a same information density is to be utilized at any one time for both portions of the link, as monitoring link conditions at each end of the link may detect conditions wherein either the uplink or downlink may not be able to sustain communication at a higher information density. For example, in a point-to-multi-point system utilizing a plurality of cell sites, as described in the above referenced patent application entitled "SYSTEM AND METHOD FOR BROADBAND MILLIMETER WAVE DATA COMMUNICATION", the level of interference is not necessarily equal in the forward and reverse links. Accordingly, such a system may be operated at different information densities in the forward and reverse links.

Figure 2:
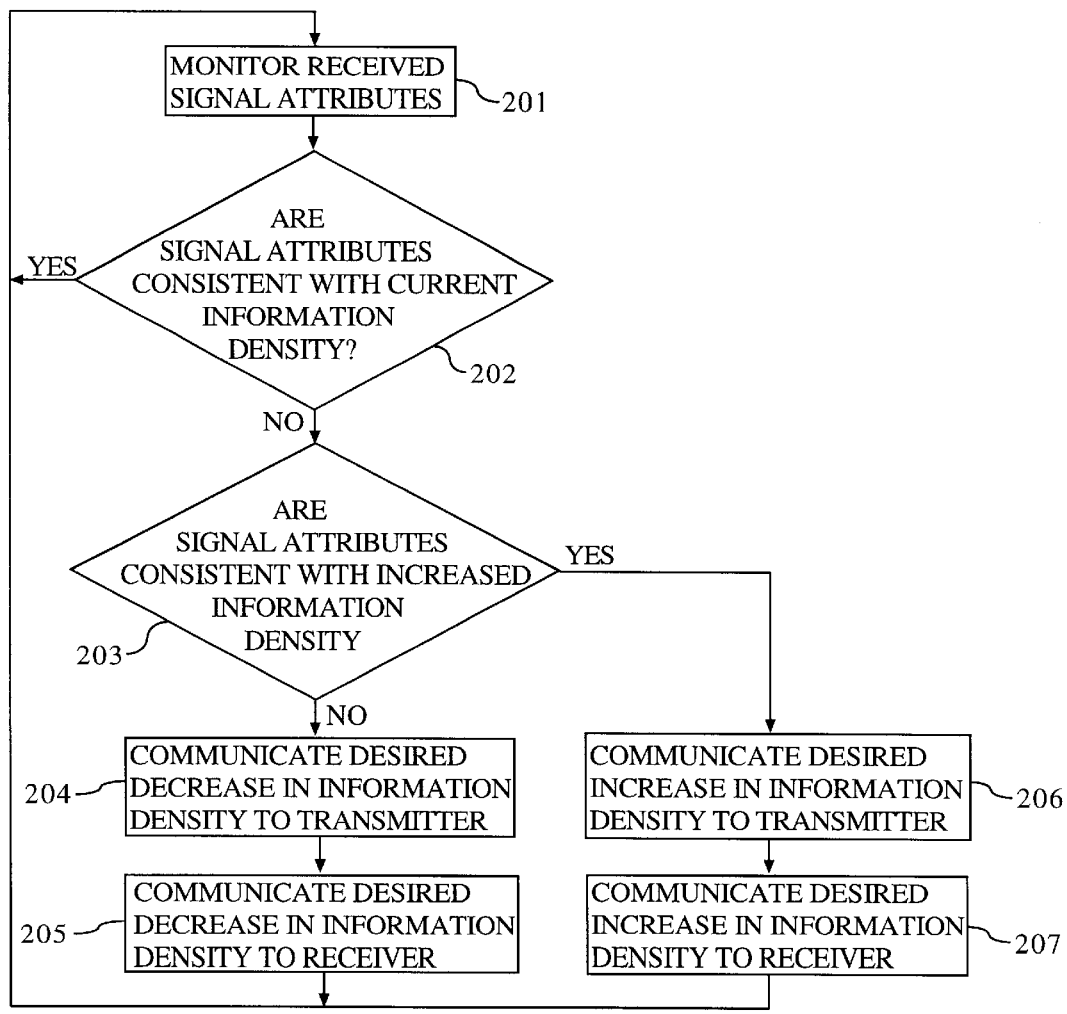
FIG. 2 shows a flow diagram of adjusting information density according to the present invention.

Directing attention to FIG. 2, a flow diagram showing the adjustment of information density according to a preferred embodiment of the present invention is illustrated. It shall be appreciated that the steps of FIG. 2 may be performed utilizing a processor-based controller, such as a general purpose computer operating under control of an instruction set operable to perform the steps of FIG. 2, coupled to the appropriate receiver and transmitter equipment at each or either end of the link.

According to this preferred embodiment of the present invention, received signal attributes, such as the aforementioned RS SI, SNR and SNRE as received, at the hub in the uplink and at the node in the downlink, are measured at step 201. Thereafter, a determination is made as to whether the measured signal attributes are consistent with the information density currently utilized in the link (step 202). This determination may be made such as through reference to a knowledge base relating signal attributes such as RSSI, SNR, and SNRE to particular information densities, such as may be stored in a memory associated with the aforementioned processor-based controller. This information base is preferably generated and/or updated through correlating historically measured signal attributes to an information density determined to be acceptable when communicated through a link having such attributes. Determination of acceptability may be through additional link attribute measurement, such as a bit error rate (BER) or other link quality measurement, associated with a particular information density utilized during the presence of the monitored link attributes.

If at step 202 it is determined that the monitored attributes are consistent with the current information density, i.e., neither an increase in or decrease in information density is desired, processing returns to step 201. Accordingly the received signal attributes may again be measured for detecting a change in link conditions which may dictate an adjustment in information density.

However, if at step 202 it is determined that the monitored attributes are not consistent with the current information density, processing continues to step 203. At step 203 a determination is made as to whether the measured signal attributes are consistent with an increase in the information density utilized in the link. If it is determined that the monitored attributes are not consistent with an increase in information density, then processing proceeds to steps 204 and 205 where the transmitter and receiver equipment associated with the received signal are instructed to decrease information density. If, however, at step 203 it is determined that the monitored attributes are consistent with an increase in the information density utilized in the link, then processing proceeds to steps 206 and 207 where the transmitter and receiver equipment associated with the received signal are instructed to decrease information density.

It shall be appreciated that substantially simultaneous adjustment of the transmitter and receiver equipment is desired in order to avoid information loss due to one end of this portion of the link being adjusted for a previously selected information density and the other end of the link being adjusted for a newly selected information density. Accordingly, a preferred embodiment of the present invention utilizes a control field associated with particular payload data in order to indicate to receiving equipment the information density of the payload.

However, as described above, one end of the link may detect the adjustment in information density independently. Therefore, an alternative embodiment of the present invention may eliminate either steps 204 and 206 or 205 and 207 depending on which end of the link is adapted to detect the information density adjustment.

The steps illustrated in FIG. 2 may be utilized for information density adjustment in both an uplink and a downlink according to the present invention. For example, where the information density is adjusted independently for each of these portions of a link, the steps of FIG. 2 may be performed separately with respect to both the uplink (i.e., the transmitter equipment of a node and the receiver equipment of an associated hub) and the downlink (i.e., the receiver equipment of a node and the transmitter equipment of an associated hub). Alternatively, where a same information density is utilized in both the uplink and downlink, the received signal attributes monitored at step 201 may include both those of node receiver equipment and hub receiver equipment. Thereafter, the determination of a desired information density for both of these portions of the link may be based upon this combination of attributes.

It shall be appreciated that particular ones of the steps illustrated in FIG. 2 may be operable at either end of the link, depending on a particular control infrastructure desired. For example, receiver equipment at a node may monitor received signal attributes and thereafter determine a particular information density which should be utilized. This information may be communicated to transmitter equipment at an associated hub in order to effectuate the desired information density adjustment. Similarly, the receiver equipment may monitor received signal attributes and transmit this raw information to the associated hub for a determination as to a particular information density which should be utilized. The hub may then adjust its transmitter equipment and communicate the desired information density adjustment to the node.

In the alternative embodiment described above where a same information density is utilized by both portions of the link, received signal attribute measurements may be made at both node receiver equipment and associated hub receiver equipment. Accordingly, the node receiver equipment may communicate the received signal attribute information to a controller disposed at an associated hub where the determination as to a proper information density is made and the determination communicated from this controller to the receiver and transmitter equipment of the hub as well as to the receiver and transmitter equipment of the node.

Figure 3:
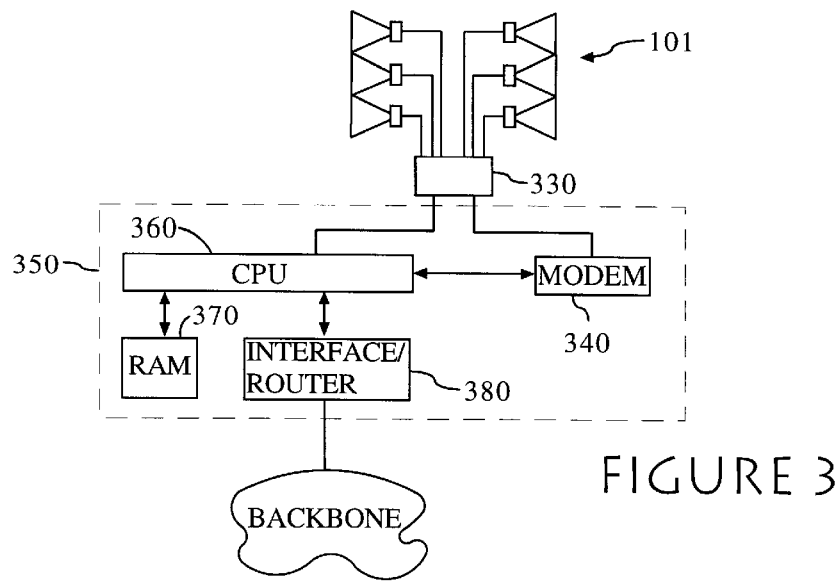
FIG. 3 shows a communication hub adapted for use according to the present invention.

A preferred embodiment of hub 101 adapted according to the present invention is shown in FIG. 3. Hub 101 includes outdoor unit (ODU) controller 330 coupled to individual antenna elements which may be utilized in establishing an airlink with nodes such as nodes 102–105. ODU controller 330 is coupled to RF modem 340 and indoor unit (IDU) controller 350. Although a separate connection from ODU controller 330 is illustrated to modem 340 and CPU 360, it shall be appreciated that communication between ODU controller 330 and IDU controller 350 may be accomplished through the path connecting modem 340 to the ODU controller and CPU 360. Similarly, control information relevant to the operation of ODU controller 330 may be generated by modem 340 rather than CPU 360 and therefore be communicated through a connection between ODU controller 330 and modem 340.

IDU controller 350 includes a processor identified as CPU 360, electronic memory identified as RAM 370, and an interface and/or router identified as interface/router 380. Stored within RAM 370 is a switching instruction algorithm to provide switching instruction or synchronization to ODU controller 330. Buffering for information communicated through modem 340 or interface/router 380 may also be provided by RAM 370. Likewise, RAM 370 may also contain additional stored information such as, for example, antenna element correlation tables, link management information including the aforementioned instruction set utilized in controlling the adjustment of link information density, initialization instructions, modem configuration instructions, power control instructions, error correction algorithms, and other operation instructions.

Figure 4:
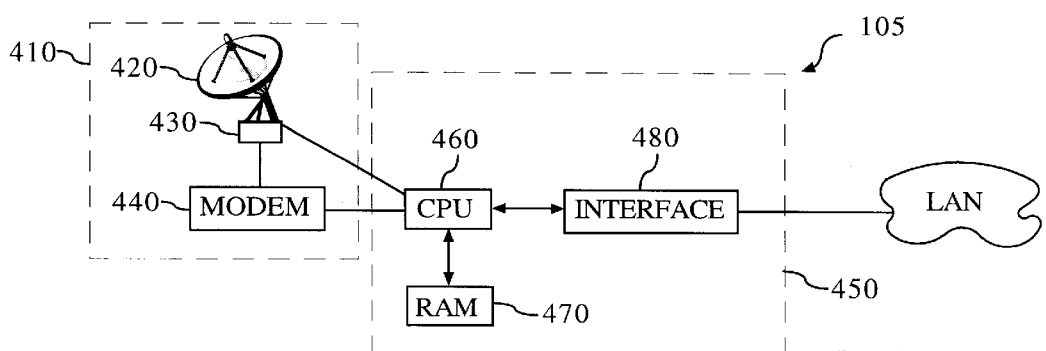
FIG. 4 shows a communication node adapted for use according to the present invention.

Having described a preferred embodiment of hub 101, attention is now directed toward FIG. 4 wherein a preferred embodiment of node 105 is more fully illustrated. This preferred embodiment node 105 comprises two primary components, outdoor unit 410 and indoor unit 450, as depicted in FIG. 4. Outdoor unit 410 includes an antenna 420, module 430 and modem 440.

Indoor unit 450 includes CPU 460, RAM 470 and interface 480. It shall be understood that indoor unit 450 and outdoor unit 410 are coupled such that information received by antenna 420 as RF energy is communicated to indoor unit 450.

RAM 470 is coupled to both interface 480 and CPU 460. Where TDM is being used at hub 101, RAM 470 may store information received at node 105 through interface 480 while awaiting transmission to hub 101. RAM 470 may also contain additional stored information such as, for example, initialization instructions and link management information including the aforementioned instruction set utilized in controlling the adjustment of link information density, modem configuration instructions, power control instructions and error correction instructions.

Preferably, modems 340 and 440 are variable rate modems, such as are available commercially from various manufacturers including BroadCom Corporation, Philips, and VLSI Technology. Such a variable rate modem provides for the transmission of variable information densities (i.e., various numbers of bits per symbol), for example from 17 to 51 Mbps (corresponding to 4 QAM, encoding two bits per symbol, up to 256 QAM, encoding 8 bits per symbol), at a fixed baud rate, such as 8.5 Mbaud. Typically such a modem utilizes matched data filtering that results in an occupied RF bandwidth that is 15% to 30% in excess of the theoretical Nyquist bandwidth. The variable modem can be useful in increasing spectral efficiency by changing the density of the information communicated to the served users depending on communication attributes such as their relative distance from the hub.

The preferred embodiments of hub 101 and node 105 include the aforementioned link maintenance algorithm in RAM 370 of the hub and/or RAM 470 of the node to monitor communication parameters or attributes, such as RSSI, SNRE, and/or errors in communications, associated with the information communication links. Upon determination of the existence of unacceptable communication parameters, such as an RSSI and/or SNRE too low for a current information density or an unacceptable error rate as determined by comparison to a predetermined acceptable error rate, CPU 360 and/or CPU 460 may transmit an instruction to the corresponding node or hub to make appropriate adjustment. Accordingly, CPU 360, operating under control of instructions stored in RAM 370, may monitor received signal conditions at hub 101, such as through the link with ODU controller 330, and/or accept information regarding received signal conditions at a node, such as may be demodulated from a uplink signal from modem 340. Thereafter, CPU 360 may make a determination as to a desired link information density, such as through reference to a database stored in RAM 370, and thereafter adjust the appropriate circuitry, such as by adjustment of circuitry coupled thereto in IDU controller 350 and/or providing control signals for modulation by modem 340 for communication to the appropriate node.

Likewise, CPU 460, operating under control of instructions stored in RAM 470, may monitor received signal conditions at node 105, such as through the link with ODU controller 430, and/or accept information regarding received signal conditions at an associated hub, such as may be demodulated from a downlink signal from modem 440. Thereafter, CPU 460 may make a determination as to a desired link information density, such as through reference to a database stored in RAM 470, and thereafter adjust the appropriate circuitry, such as by adjustment of circuitry coupled thereto in IDU controller 450 and/or providing control signals for modulation by modem 440 for communication to the associated hub.

For example, CPU 360 may instruct node 105 to adjust communication transmission power to achieve an acceptable error rate or to adjust the M-ary QAM signaling level (QAM rate) at which information is transmitted. Of course, CPU 360 may also provide such control signals to the various QAM modulators or a QAM mapper associated with the hub to result in the proper modulation/demodulation of the signal communicated to the node. As above, these control functions associated with link maintenance may be communicated between CPU 360 and CPU 460 by means of a designated control function sub-band or control header. Upon detecting a control instruction to adjust communications, CPU 460 provides the necessary instruction to the proper component. For example, as discussed above with respect to the hub, CPU 460 may cause module 430 to adjust transmission power or may cause modem 440 to adjust the QAM rate, depending on the attribute effected or the control information transmitted by the hub.

As described above, a preferred embodiment of the present invention utilizes variable QAM modes in order to provide adjustable information density according to the present invention. QAM utilizes a constellation consisting of a square lattice of signal points. The number of available signal points, and therefore the information density, varies depending on the QAM level.

Figure 5A:
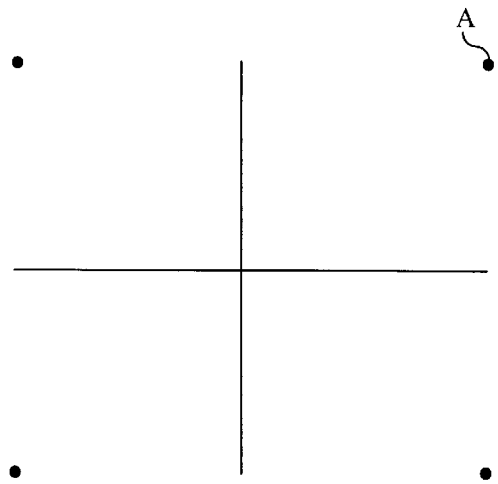
FIGS. 5A through 5D show M-ary QAM constellations.
Figure 5B:
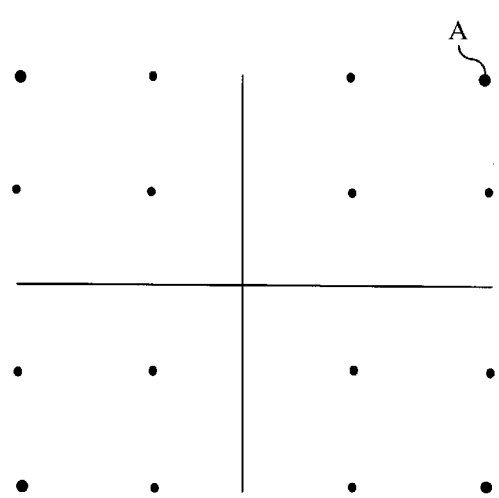
Figure 5C:
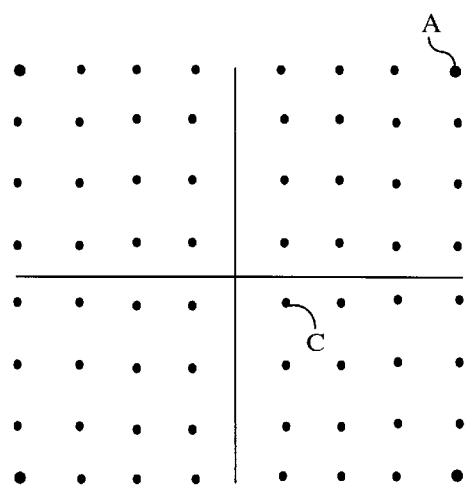
Figure 5D:
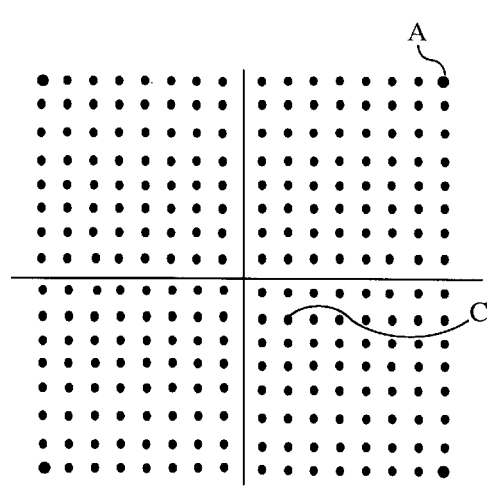

Directing attention to FIGS. 5A–5D, constellation diagrams of an M-ary QAM signal set are shown. Specifically, FIG. 5A shows a 4-QAM constellation, FIG. 5B shows a 16-QAM constellation, FIG. 5C shows a 64-QAM constellation, and FIG. 5D shows a 256-QAM constellation. It should be appreciated, although having a fewer number of signal points, that the signal points of the lower order constellations correspond to signal points in the higher level constellations. For example, point A of the 4-QAM constellation corresponds to point A of each of the 16-QAM, 64-QAM, and 256-QAM constellations. Similarly, point C of the 64-QAM constellation corresponds to point C of the 256-QAM constellation, although having no corresponding point in the lower order constellations.

A preferred embodiment of the present invention takes advantage of the corresponding signal points in the various levels of QAM modulation in order to provide simplified, and more quickly adjusted, transmission of various QAM rates. Accordingly, on the transmit end of the link, transmitter equipment, such as a modulator, may be configured to operate persistently at a high enough information density to support any desired lower density. For example, with respect to transmitted signals, modems 340 and 440 of FIGS. 3 and 4 may be adjusted to operate at 256-QAM mode at all time. Thereafter, 4-QAM, 16-QAM, and 64-QAM may be emulated by the way in which data bits are mapped or modulated into the signal points of the 256-QAM constellation.

Figure 6A:
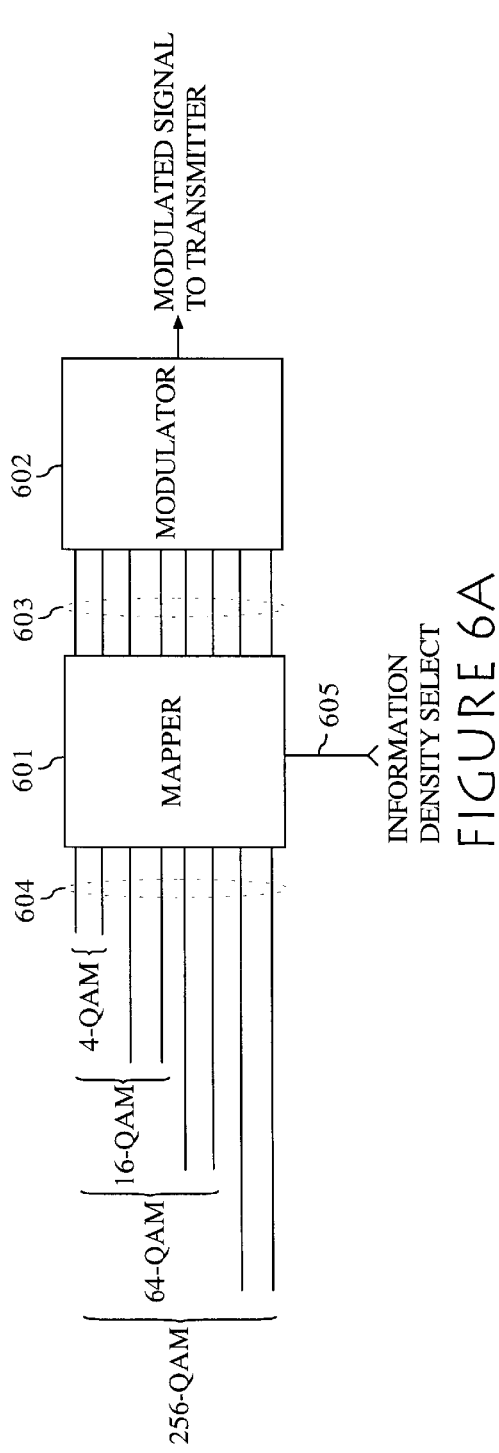
FIGS. 6A and 6B show circuitry adapted to map various information densities into different order modulations.

Directing attention to FIG. 6A, circuitry adapted to provide real time adjustment of transmitted information density within a QAM modulated signal is shown. Here modulator 602, which may be a modulator such as found in modems 340 and 440, is adapted to accept 8 data bits through data lines 603 in order to provide 256-QAM information density. Mapper 601 is disposed between data lines 604 and modulator 602. Accordingly, information to be communicated according to the present invention, regardless of the desired information density, is presented to mapper 601 in order to be mapped into the proper 8 data bits of a 256-QAM signal point corresponding to the signal point of a QAM rate of the data as presented. In example, where two data bits to be modulated correspond to signal point A of FIG. 5A (4-QAM, these two bits will be provided to mapper 601 through data lines 604 to produce eight data bits at data lines 603 corresponding to signal point A of FIG. 5D (256-QAM). Likewise, where six data bits to be modulated correspond to signal point C of FIG. 5C (64-QAM, these six bits will be provided to mapper 601 through data lines 604 to produce eight data bits at data lines 603 corresponding to signal point C of FIG. 5D (256-QAM).

It shall be appreciated that mapper 601 of the present invention may comprise a database correlating data bits of one information density (lower level QAM rate) with data bits of another information density (higher level QAM rate). Accordingly, mapper 601 may utilize information, such as may be provided through data line 605, indicating a particular density level, or levels, from which or to which data bits are to be mapped. Alternatively, particular ones of the data lines may be terminated in such a way, or otherwise provided with an appropriate signal, so as to indicate a desired information density. Additionally, instead of, or in addition to, the aforementioned database, mapper 601 may utilize mathematical algorithms suitable for determining the data bits of various information densities which correspond to other information densities.

Figure 6B:
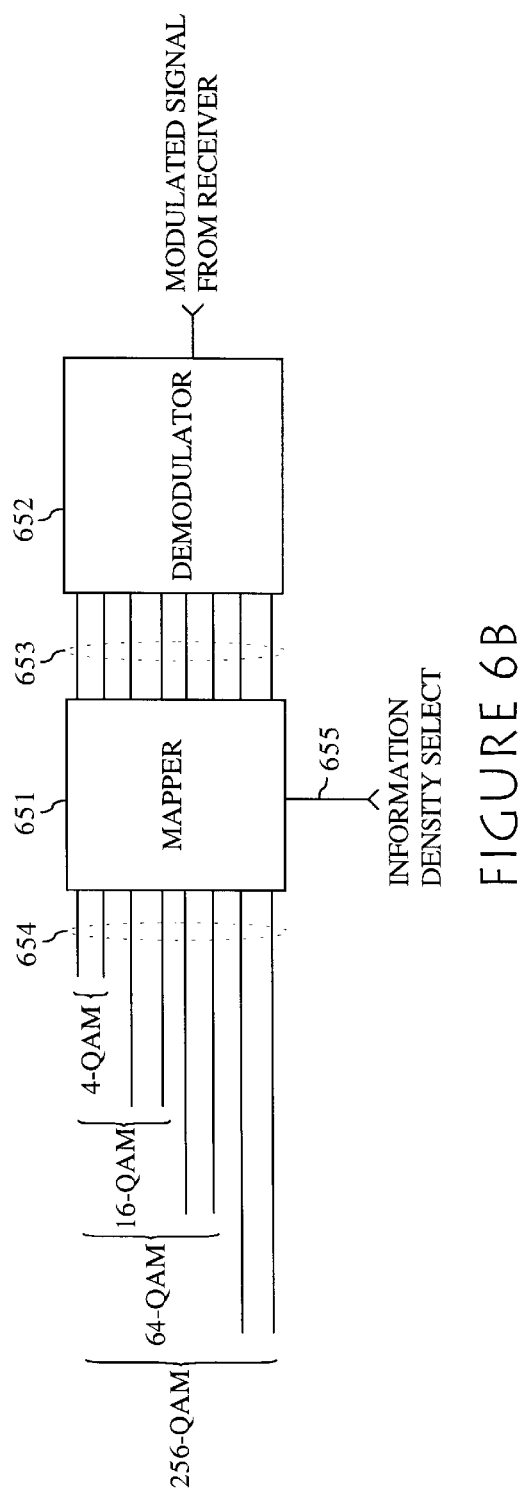

Directing attention to FIG. 6B, circuitry adapted to provide real time adjustment of received information density of a QAM modulated signal is shown. Here demodulator 652, which may be a demodulator such as found in modems 340 and 440, is adapted to accept a signal of varying levels of modulation and output a corresponding number of data bits through data lines 653. For example, a 256-QAM signal will be demodulated by demodulator 652 as 8 data bits when demodulator 652 is adjusted properly.

However, as will be discussed in detail below, information provided to demodulator 652 as a received signal may include multiple levels of modulation, i.e., a control channel may be modulated as 4-QAM, while a payload cell is modulated as 64-QAM. Therefore, utilizing the aforementioned correspondence between data points of the various modulation levels, although provided to mapper 651 in a number of bits associated with a different level of modulation, this lower order information may be remapped to the signal points of the proper QAM constellation by mapper 651 for output at data lines 654.

It shall be appreciated that the above described embodiment utilizing a mapper in order to emulate adjusting of the information density of a received signal provides for the instantaneous adjustment of the information density even within a burst period as there is no actual change made at the demodulator. Moreover, information modulated at a known lower order modulation may be accurately demodulated regardless of a charge in modulation in a payload cell, which does not correspond to a modulation level selected at the demodulator, as the signal points of this lower order modulation will correspond to a same constellation position regardless of the demodulation setting of the demodulator. Accordingly, control information, such as a change in information density may always be properly demodulated to provide for the proper adjusting of the demodulator only when an actual change in information density has occurred.

Likewise, it shall be appreciated that the above described embodiment utilizing a mapper in order to emulate adjusting of the information density of a transmitted signal provides for instantaneous adjustment of the information density as there is no change made at the modulator. Instead, the data bits to be modulated are remapped in real time to present data bits of a corresponding signal point to the modulator without any adjustment to the modulator. This is especially desirable in situations where the transmitter is in communication with a plurality of nodes at different modulation levels, such as illustrated in FIG. 1, through the use of time division multiple access (TDMA).

Figure 7:
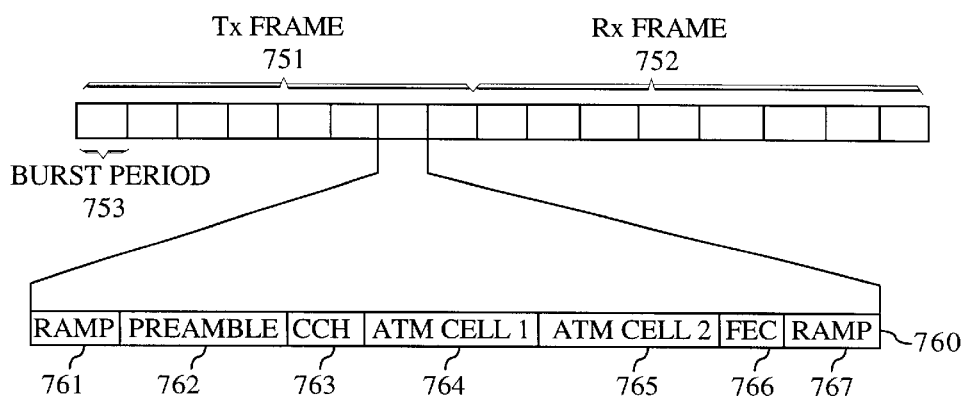
FIG. 7 shows a TDMA frame and burst period format useful according to the present invention.

For example, the available spectrum may be broken down to include channels which are themselves broken down into transmit (Tx) and/or receive (Rx) frames. Additionally, each Tx and Rx frame may be divided into discrete burst periods to provide for TDMA utilization of each channel. In a preferred embodiment, as illustrated in FIG. 7, Tx and Rx frames (frames 751 and 752), each being 250 μsec for example, are divided into eight burst periods whereby full duplexing may be synthesized in sixteen such burst periods. The TDMA burst periods may be further broken down into protocol time slots; a protocol time slot being a sufficient time for communicating an information packet formatted to a predefined protocol. For example, each channel may be utilized to communicate two 53 byte ATM cells in a TDMA burst period utilizing QAM.

A preferred embodiment of information formatting within a TDMA burst period is illustrated as burst 760 in FIG. 7. Here each burst contains ramp 761 followed by preamble 762. Preamble 762 is followed by CCH block 763. CCH block 763 is followed by ATM cells 764 and 765 which in turn are followed by FEC block 766. FEC block 766 is similarly followed by ramp 767.

It shall be understood that in the above identified TDMA burst period ramps 761 and 767 are time segments within the burst period to allow for a transmitter to come to fill power and to again de-energize without affecting the power at which message information is transmitted. Preamble 762 and forward error correction (FEC) block 766, like the ramp components, are system overhead components and are used to aid in the transmission of information contained in ATM cells 764 and 765. Specifically, preamble 762 contains a dotting pattern to resynchronize the symbol clock at a receiving site. FEC 766 provides for error detection and correction of the transmitted information.

Control channel (CCH) 763, as previously discussed, is provided to communicate system control information, such as the aforementioned adjustment in QAM rate. For example, CCH 763 of each burst period may indicate an information density of the payload of the burst period, here ATM cells 764 and 765, in order that information density may be adjusted on a time burst by time burst basis. However, in an alternative embodiment of the present invention, adjustment of information density is accomplished on a frame or superframe, i.e., a series of four frames, basis. Accordingly, control information with respect to information density may be included in a single burst period of a frame or superframe and, thus, conserve overhead and provide more bandwidth for payload. The adjusting of information density on a frame or superframe basis also serves the purpose of allowing more reaction time at the receiving end of the link in order to adjust receiving equipment and reach a steady state. Additionally, or alternatively, the control channel information with respect to information density may be associated with a change in information density, not in a payload cell of the current burst period, but of a burst period to follow, such as in a next frame or super frame. Accordingly, the information density adjustment information may provide a sufficient time for the appropriate equipment to make the necessary adjustments.

It is desired that the receiver be able to recognize and adapt to the adjustments in information density in order that information is not lost or demodulation mistakes are not made, i.e., a 4-QAM information packet is not demodulated as if it were a 64-QAM information packet. Accordingly a preferred embodiment of the present invention utilizes a common modulation technique for control channel information, regardless of the information density of an associated payload, to ensure that information with respect to adjustments in the information density are always accurately demodulated by the receiver. For example, control channel information, including information with respect to the level of information density associated with a corresponding payload portion, may be modulated at a lowest common information density, i.e., 4-QAM, in order that all systems operating on a common IDMA signal, regardless of their position and link conditions, are able to properly detect and demodulate this control information. Accordingly, although an information density adjustment may be made, the corresponding control channel information will be of a known information density and, therefore, may be properly demodulated to reveal the change in payload information density.

It shall be appreciated that through the use of QAM as previously discussed, the information density of each ATM cell of burst 760 may be increased. For example, using two ATM cells, as illustrated in FIG. 3B, with 4 QAM, the time slot capacity realized is ½ DS1. Moreover, by utilizing increased modulation, this capacity may be increased. Using 16 QAM the time slot capacity realized is 1 DS1; using 64 QAM the time slot capacity realized is 1½ DS1; and using 256 QAM the time slot capacity realized is 2 DS1.

Accordingly, the present invention may be utilized to deliver multiple services with variable availability over the same link. For example, a very high availability service combined with a tier of lower availability services may be delivered utilizing the present invention. Accordingly, a node could receive a tier of services including a very high availability DS1 for voice, a high availability DS1 for corporate data, a medium availability DS1 for corporate e-mail, and a low availability DS1 for Internet access. As information density is ratcheted down due to link conditions, the availability of lower tiered services may be suspended in favor of maintaining the availability, and data rate, of higher tiered services. Thereafter, as information density is ratcheted up in response to improved link conditions, the lower tiered services may again become available. Accordingly, it shall be appreciated that the present invention may operate to provide additional services within the signal to noise ratio cushion of a link adjusted for a particular worst case scenario without requiring any additional spectrum utilization.

Similarly, the present invention may deliver substantially higher data rates over a longer distance while still guaranteeing a nominal data rate with very high availability. For example, in the aforementioned QAM example, a data connection service could be provided which delivers a minimum data rate of 512 Kb/s but operates at 2.048 Mb/s most of the time. Accordingly, it shall be appreciated that the present invention may operate to provide increased data rate within the signal to noise ratio cushion of a link adjusted for a particular worst case scenario without requiring any additional spectrum utilization.

It shall be appreciated that the above example of information formatting is but one embodiment of communication utilizing TDMA burst periods. There are innumerable methods by which to utilize the above disclosed burst periods of the Tx and Rx frames for communication. For example, any of the above components could be deleted, as well as any number of different components added, if desired. Therefore, it shall be understood that the present invention is not limited to the format of the TDMA burst period illustrated.

Figure 8:
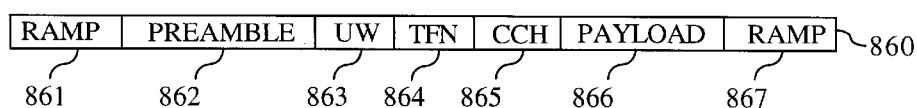
FIG. 8 shows an alternative embodiment of a TDMA burst period format useful according to the present invention.

For example, directing attention to FIG. 8, an alternative embodiment of information formatting within a TDMA burst period is illustrated as burst 860. Here, as with burst 760, each burst contains ramp 861 followed by preamble 862. Preamble 862 is followed by unique word (UW) block 863. UW block 863 is followed by timeslot frame number (TFN) block 864 which is followed by CCH block 865. CCH block 865 is followed by payload cell 866 which in turn is followed by ramp 867.

As with burst 760 described above, ramps 861 and 867 are time segments within the burst period to allow for a transmitter to come to full power and to again de-energize without affecting the power at which message information is transmitted. Preamble 862 and unique word (UW) block 863, like the ramp components, are system overhead components and are used to aid in the transmission of information contained in payload cell 866. Specifically, preamble 862 contains a dotting pattern to resynchronize the symbol clock at a receiving site. The unique word is also used for synchronization by identifying the point in the burst at which communicated information begins. Control channel (CCH) 865, as with CCH 763 discussed above, is provided to communicate system control information, such as the aforementioned adjustment in QAM rate.

In a preferred embodiment, the payload portion of burst 860 is of variable length, i.e., variable payload duration. For example, although the number of bursts or time slots per frame may be fixed, the duration of the time slots may be varied in order to provide a desired payload capacity. Accordingly, the frames of the present invention may be utilized to provide desired data rates even with adjustment of the information density according to the present invention. For example, a system located relatively near a hub, such as node 102, may communicate via a TDMA signal at 64-QAM and, therefore, require less payload area in order to realize a desired data rate than a system located relatively far from the hub, such as node 105, when communicating via the same TDMA signal at 4-QAM. In order to provide a same data rate as between these two systems, the payload cell of time slots associated with node 105 may be enlarged to three times that of the payload cells associated with node 102.

However, when conditions allow the use of higher information densities to node 105, the payload cell of time slots associated therewith may be reduced a corresponding amount, i.e., when conditions allow 64-QAM at node 105, payload cells directed thereto may be equivalent to those directed to node 102.

It shall be appreciated that varying of the payload cells may be accomplished through control signals communicated within the aforementioned control channels.

However, in order to reduce the bandwidth utilized by overhead control information, and in order to allow sufficient time for reacting, a preferred embodiment of the present invention varies payload cells on a frame or superframe basis as described above.

Although described above with reference to QAM modulation techniques, it shall be appreciated that the present invention may be implemented utilizing other multiple information density formats as well. For example, two-level modulation formats such as FSK may be utilized, such as by varying the data rate as a function of signal to noise, by changing the receiver bandwidth.

Although the present invention and its advantages have been described in detail, it should be understood that various changes, substitutions and alterations can be made herein without departing from the spirit and scope of the invention as defined by the appended claims.

What is claimed is:

1. A system for providing dynamically adjustable information density over a communication link, wherein said communication link is adapted so as to provide a minimum level of link availability, said system comprising:

a monitor in communication with said link adapted to monitor an attribute of said link wherein said monitored attribute is selected from the group consisting of:
an error rate of a receive signal;
a signal to noise ratio;
a signal to noise ratio estimate;

a signal to interference ratio; and
a power level of a receive signal;
a controller in communication with said monitor adapted to accept information therefrom and to determine an optimum information density for information communication via said link at least in part as a function of said monitored attribute; and
a manipulator in communication with said controller adapted to accept information therefrom and to adjust equipment communicating via said link to said optimum information density.

2. The system of claim 1, wherein said equipment adjusted by said manipulator includes transmitter equipment to cause said transmitter equipment to adjust the information density of transmitted information from a first level to a second level of a plurality of predefined information density levels.

3. A system for providing dynamically adjustable information density over a communication link, wherein said communication link is adapted so as to provide a minimum level of link availability, said system comprising:
a monitor in communication with said link adapted to monitor an attribute of said link;
a controller in communication with said monitor adapted to accept information therefrom and to determine an optimum information density for information communication via said link at least in part as a function of said monitored attribute; and
a manipulator in communication with said controller adapted to accept information therefrom and to adjust equipment communicating via said link to said optimum information density,
wherein said equipment includes transmitter equipment to adjust the information density of transmitted information from a first level to a second level of a plurality of predefined information density levels, and
wherein said transmitter equipment comprises mapper circuitry adapted to accept information at a plurality of densities and output said accepted information at a predetermined density irrespective of the density of said accepted information, wherein said output information is associated with a signal point of said predetermined density corresponding to a signal point of said density of said accepted information associated with said accepted information.

4. The system of claim 3, wherein said transmitter equipment persistently operates in a high order information density mode, and wherein said transmitter equipment operates to emulate a lower order information density mode as a function of said accepted information being properly mapped to said high order information density.

5. The system of claim 3, wherein said predetermined density is a maximum density determined to provide acceptable communication via said communication link.

6. A system for providing dynamically adjustable information density over a communication link, wherein said communication link is adapted so as to provide a minimum level of link availability, said system comprising:
a monitor in communication with said link adapted to monitor an attribute of said link;
a controller in communication with said monitor adapted to accept information therefrom and to determine an optimum information density for information communication via said link at least in part as a function of said monitored attribute; and
a manipulator in communication with said controller adapted to accept information therefrom and to adjust equipment communicating via said link to said optimum information density,
wherein said equipment includes transmitter equipment to adjust the information density of transmitted information from a first level to a second level of a plurality of predefined information density levels, and
wherein said equipment adjusted by said manipulator includes receiver equipment to cause said receiver equipment to adjust for the reception of information from a first level to a second level of a plurality of predefined information density levels.

7. The system of claim 6, further comprising:
a control channel defined in said communication link, wherein said adjustment of receiver equipment by said manipulator includes the use of information transmitted via said control channel.

8. The system of claim 7, wherein said receiver equipment comprises:
mapper circuitry adapted to accept information at a plurality of densities and output said accepted information at a predetermined density irrespective of the density of said accepted information, wherein said output information is associated with a signal point of said predetermined density corresponding to a signal point of said density of said accepted information associated with said accepted information.

9. The system of claim 8, wherein said receiver equipment operates to emulate a low order information density mode at least with respect to said control channel information as a function of said accepted information being properly mapped to said low order information density.

10. The system of claim 8, wherein said predetermined density is a minimum density determined to provide highly reliable communication via said communication link.

11. The system of claim 1, wherein said a minimum level of link availability of said communication link is associated with a minimum data rate, and wherein adjustment of said information density provides a data rate in excess of said minimum data rate.

12. The system of claim 1, wherein said minimum level of link availability of said communication link is associated with a minimum service tier, and wherein said adjustment of said information density provides a service tier in excess of said minimum service tier.

13. The system of claim 1, wherein information communicated over said communication link is at a constant baud rate, and wherein adjustment of said adjustable information density includes changing from one modulation level to another modulation level of a multi-level modulation format at said constant baud rate.

14. The system of claim 13, wherein said multi-level modulation format is a QAM format.

15. The system of claim 13, wherein said multi-level modulation format is a PSK format.

16. The system of claim 13, wherein said multi-level modulation format is a FSK format.

17. The system of claim 13, wherein said multi-level modulation format is an ASK format.

18. The system of claim 13, wherein said multi-level modulation format is a CAP format.

19. The system of claim 1, wherein said link includes a wireless communication link.

20. The system of claim 19, wherein said link provides a TDMA channel including a plurality of time slots, wherein ones of said time slots may provide a different information density.

21. The system of claim 20, wherein said time slots of said TD mA channel include a payload portion and a control channel portion, wherein the information density of said payload portion is adjustable from time slot to time slot and the information density of said control channel portion is persistently held at a predetermined information density.

22. The system of claim 21, wherein said predetermined density is a minimum density determined to provide highly reliable communication via said communication link.

23. A system for providing dynamically adjustable information density over a wireless communication link, wherein said communication link is adapted so as to provide a minimum level of link availability, said system comprising:
- a monitor in communication with said link adapted to monitor an attribute of said link;
- a controller in communication with said monitor adapted to accept information therefrom and to determine an optimum information density for information communication via said link at least in part as a function of said monitored attribute; and
- a manipulator in communication with said controller adapted to accept information therefrom and to adjust equipment communicating via said link to said optimum information density,
  - wherein said wireless communication link is adjusted to provide said minimum link availability during the occurrence of an expected time varying event.

24. The system of claim 23, wherein said wireless communication link is a microwave link and said adjustment of provide said minimum link availability includes a transmit power to compensated for a maximum expected rain fade.

25. A system for providing dynamically adjustable information density over a wireless communication link, wherein said communication link is adapted so as to provide a minimum level of link availability, said system comprising:
- a monitor in communication with said link adapted to monitor an attribute of said link;
- a controller in communication with said monitor adapted to accept information therefrom and to determine an optimum information density for information communication via said link at least in part as a function of said monitored attribute; and
- a manipulator in communication with said controller adapted to accept information therefrom and to adjust equipment communicating via said link to said optimum information density,
  - wherein said link provides a TDMA channel including a plurality of variable duration time slots.

26. The system of claim 25, wherein a duration a time slot of said variable duration time slots is adjusted to provide a desired payload capacity.

27. The system of claim 26, wherein adjustment of said duration of said time slot is in association with adjustment for said optimum information density.

28. A system for optimizing in real time an information density of a plurality of information densities utilized in information communication via a link, said system comprising:
- a means for maintaining a desired level of link availability including establishing at least one communication parameter commensurate with said desired level of link availability;
- means for monitoring in real time at least one attribute of said link;
- means for determining, at least in part as a function of said monitored at least one attribute, an optimum information density of said plurality of information densities for information communication via said link, wherein utilization of said determined optimum information density is consistent with said communication parameter under link conditions associated with said monitored at least one attribute; and
- means for adjusting an information density of data transmitted through said link to said optimum information density,
- wherein said at least one link parameter is selected from the group consisting of:
  - a transmit power level;
  - a receive power level;
  - a signal to noise ratio estimate;
  - a signal to noise ratio; and
  - a communication quality indication.

29. A system for optimizing in real time an information density of a plurality of information densities utilized in information communication via a link, said system comprising:
- a means for maintaining a desired level of link availability including establishing at least one communication parameter commensurate with said desired level of link availability;
- means for monitoring in real time at least one attribute of said link;
- means for determining, at least in part as a function of said monitored at least one attribute, an optimum information density of said plurality of information densities for information communication via said link, wherein utilization of said determined optimum information density is consistent with said communication parameter under link conditions associated with said monitored at least one attribute; and
- means for adjusting an information density of data transmitted through said link to said optimum information density,
- wherein said monitored at least one attribute is selected from the group consisting of:
  - a receive power level;
  - a signal to noise ratio estimate;
  - a signal to noise ratio; and
  - a communication quality indication.

30. The system of claim 28 wherein said monitoring means comprises:
- means for monitoring in real time said at least one attribute in an uplink portion of said link; and
- means for monitoring in real time said at least one attribute in a downlink portion of said link.

31. The system of claim 28 wherein said determining means comprises:
- means for correlating a particular information density with said monitored at least one attribute.

32. The system of claim 31, wherein said correlating means references a database storing historical information with respect to information densities which provide at least said desired level of link availability under conditions associated with said monitored at least one attribute.

33. The system of claim 28 wherein said determining means comprises:
- means for comparing said monitored at least one attribute to information with respect to said at least one communication parameter, wherein said optimum information density is determined as a function of the comparison.

34. The system of claim 29 wherein said adjusting means comprises:
  means for emulating a selected information density without adjusting a preselected level at which information is modulated for transmission.

35. A system for optimizing in real time an information density of a plurality of information densities utilized in information communication via a link, said system comprising:
  a means for maintaining a desired level of link availability including establishing at least one communication parameter commensurate with said desired level of link availability;
  means for monitoring in real time at least one attribute of said link;
  means for determining, at least in part as a function of said monitored at least one attribute, an optimum information density of said plurality of information densities for information communication via said link, wherein utilization of said determined optimum information density is consistent with said communication parameter under link conditions associated with said monitored at least one attribute; and
  means for adjusting an information density of data transmitted through said link to said optimum information density,
  wherein said adjusting means comprises:
    means for emulating a selected information density without adjusting a preselected level at which information is modulated for transmission, and
    wherein said plurality of information densities are various QAM rates, and said mapping means maps data associated with lower order QAM rates to higher order QAM rates such that a same signal point is modulated from said mapped data at said higher order QAM as would be modulated from said input data at said lower order QAM rates.

36. The system of claim 35, wherein said plurality of information densities are various QAM rates, and said mapping means maps data associated with lower order QAM rates to a higher order QAM rate such that a same signal point is modulated from said mapped data at said higher order QAM as would be modulated from said input data at said lower order QAM rates.

37. The system of claim 29 further comprising:
  means for controlling receiving equipment in accordance with adjustment of said information density by said adjusting means.

38. The system of claim 37, wherein said controlling means comprises:
  means for providing a control signal within said link, wherein receiver equipment utilizes said control signal to detect an adjustment of information density.

39. The system of claim 38, wherein said control signal is provided at a particular information density irrespective of said optimum information density of data transmitted through said link.

40. The system of claim 39, wherein said controlling means comprises:
  means for mapping received data, regardless of an information density bit stream in which it is demodulated, into a bit stream associated with said preselected information density.

41. A system for optimizing in real time an information density of a plurality of information densities utilized in information communication via a link, said system comprising:
  a means for maintaining a desired level of link availability including establishing at least one communication parameter commensurate with said desired level of link availability;
  means for monitoring in real time at least one attribute of said link;
  means for determining, at least in part as a function of said monitored at least one attribute, an optimum information density of said plurality of information densities for information communication via said link, wherein utilization of said determined optimum information density is consistent with said communication parameter under link conditions associated with said monitored at least one attribute; and
  means for adjusting an information density of data transmitted through said link to said optimum information density,
    wherein said system is deployed in a point to multipoint microwave communication system including a communication hub in TDMA communication with a plurality of communication nodes, wherein said link is associated with a particular node of said plurality of communication nodes and said optimum information density is determined for a time slot of said TDMA communication assigned to said link independent of other time slots of said TDMA communication assigned to links associated with other nodes of said plurality of nodes.

42. A system for optimizing in real time an information density of a plurality of information densities utilized in information communication via a link, said system comprising:
  a means for maintaining a desired level of link availability including establishing at least one communication parameter commensurate with said desired level of link availability;
  means for monitoring in real time at least one attribute of said link;
  means for determining, at least in part as a function of said monitored at least one attribute, an optimum information density of said plurality of information densities for information communication via said link, wherein utilization of said determined optimum information density is consistent with said communication parameter under link conditions associated with said monitored at least one attribute; and
  means for adjusting an information density of data transmitted through said link to said optimum information density,
    wherein said link provides a plurality of variable duration time slots adjustable to provide desired payload capacity.

43. A method for optimizing in real time an information density of a data payload utilized in information communication via a link, wherein said information communication includes said data payload and control data, said method comprising the steps of:
  establishing at least one communication parameter to maintain a desired level of link availability;
  monitoring in real time at least one attribute of said link;
  determining, at least in part as a function of said monitored at least one attribute, an optimum information density for information communication of said data payload via said link, wherein utilization of said determined optimum information density is consistent with said communication parameter under link conditions associated with said monitored at least one attribute; and adjusting an information density of said payload data transmitted through said link to said optimum information density, wherein said at least one link parameter is selected from the group consisting of:
a transmit power level;
a receive power level;
a signal to noise ratio estimate;
a signal to noise ratio; and
a communication quality indication.

44. A method for optimizing in real time an information density of a data payload utilized in information communication via a link, wherein said information communication includes said data payload and control data, said method comprising the steps of:

establishing at least one communication parameter to maintain a desired level of link availability;

monitoring in real time at least one attribute of said link;

determining, at least in part as a function of said monitored at least one attribute, an optimum information density for information communication of said data payload via said link, wherein utilization of said determined optimum information density is consistent with said communication parameter under link conditions associated with said monitored at least one attribute; and adjusting an information density of said payload data transmitted through said link to said optimum information density, wherein said monitored at least one attribute is selected from the group consisting of:
a receive power level;
a signal to noise ratio estimate;
a signal to noise ratio; and
a communication quality indication.

45. The method of claim 43 wherein said monitoring step comprises the steps of:

monitoring in real time said at least one attribute in an uplink portion of said link; and monitoring in real time said at least one attribute in a downlink portion of said link.

46. The method of claim 44 wherein said adjusting step comprises the step of:

emulating a selected information density without adjusting a preselected level at which information is modulated for transmission.

47. A method for optimizing in real time an information density of a data payload utilized in information communication via a link, wherein said information communication includes said data payload and control data, said method comprising the steps of:

establishing at least one communication parameter to maintain a desired level of link availability;

monitoring in real time at least one attribute of said link;

determining, at least in part as a function of said monitored at least one attribute, an optimum information density for information communication of said data payload via said link, wherein utilization of said determined optimum information density is consistent with said communication parameter under link conditions associated with said monitored at least one attribute; and adjusting an information density of said payload data transmitted through said link to said optimum information density, wherein said adjusting step comprises the step of:
emulating a selected information density without adjusting a preselected level at which information is modulated for transmission, and
wherein said emulating step comprises the step of:
mapping input data associated with said data payload presented in a bit stream of a first magnitude into a bit stream of a second magnitude associated with said preselected level at which information is modulated for transmission.

48. The method of claim 47, wherein said emulating step comprises the step of:

mapping input data associated with said control data presented in a bit stream of a third magnitude into a bit stream of said second magnitude associated with said preselected level at which information is modulated for transmission thereby emulating two information densities within a single transmission.

49. The method of claims 48, wherein said first bit stream is selected from the group consisting of 2 bits, 4 bits, 6 bits, and 8 bits, and wherein said second bit stream is 8 bits, and wherein said third bit stream is 2 bits.

50. The method of claim 44 further comprising the step of:

controlling receiving equipment in accordance with said adjusting step.

51. The method of claim 50, wherein said controlling step comprises the step of:

providing information within said control data, wherein receiver equipment utilizes said control information to detect an adjustment of information density in said data payload.

52. The method of claim 51, wherein said controlling means comprises:

mapping received control data, regardless of an information density bit stream in which it is demodulated, into a bit stream associated with a preselected information density.

53. A method for optimizing in real time an information density of a data payload utilized in information communication via a link, wherein said information communication includes said data payload and control data, said method comprising the steps of:

establishing at least one communication parameter to maintain a desired level of link availability;

monitoring in real time at least one attribute of said link;

determining, at least in part as a function of said monitored at least one attribute, an optimum information density for information communication of said data payload via said link, wherein utilization of said determined optimum information density is consistent with said communication parameter under link conditions associated with said monitored at least one attribute; and adjusting an information density of said payload data transmitted through said link to said optimum information density, wherein said adjusting step comprises the step of:
varying a duration of a payload time slot in cooperation with adjusting said information density to provide a desired data throughput.

* * * * *